F. BATES.
CAR WHEEL.
APPLICATION FILED JAN. 21, 1920.

1,356,957.                            Patented Oct. 26, 1920.

INVENTOR
FREDERICK BATES

BY Fetherstonhaugh & Co
ATTY'S

UNITED STATES PATENT OFFICE.

FREDERICK BATES, OF CALGARY, ALBERTA, CANADA, ASSIGNOR OF ONE-HALF TO UNION IRON AND FOUNDRY LIMITED, OF CALGARY, CANADA, A CORPORATION.

CAR-WHEEL.

1,356,957.       Specification of Letters Patent.       Patented Oct. 26, 1920.

Application filed January 21, 1920. Serial No. 353,014.

*To all whom it may concern:*

Be it known that I, FREDERICK BATES, a subject of the King of Great Britain, a resident of the city of Calgary, Province of Alberta, Dominion of Canada, have invented certain new and useful Improvements in Car-Wheels, of which the following is a specification.

This invention relates to improvements in car wheels and the method of manufacturing the same, and the objects of the invention are to provide car wheels in which a steel tire and steel spokes are utilized with a cast iron hub, the spokes being anchored at one end to the hub, and being welded to the tire either by electric or oxy-acetylene welding.

The invention consists of the improved car wheel and the method of manufacturing the same disclosed in the following specification.

In the drawings.

Like characters of reference refer to like parts in the several figures.

Figure 1:
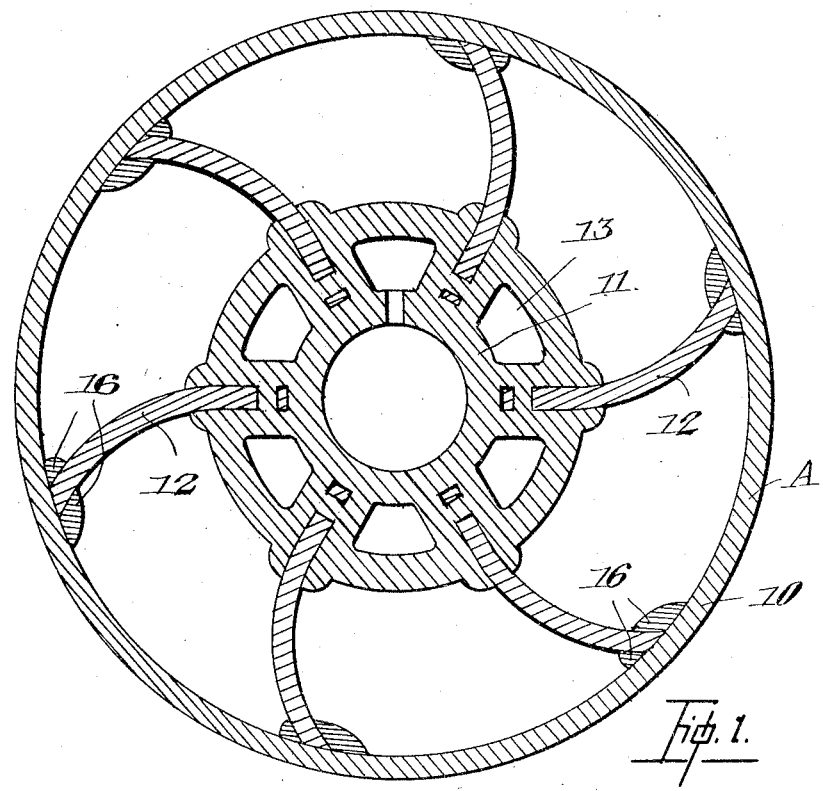
Figure 1 is a vertical section through the improved car wheel.
Figure 2:
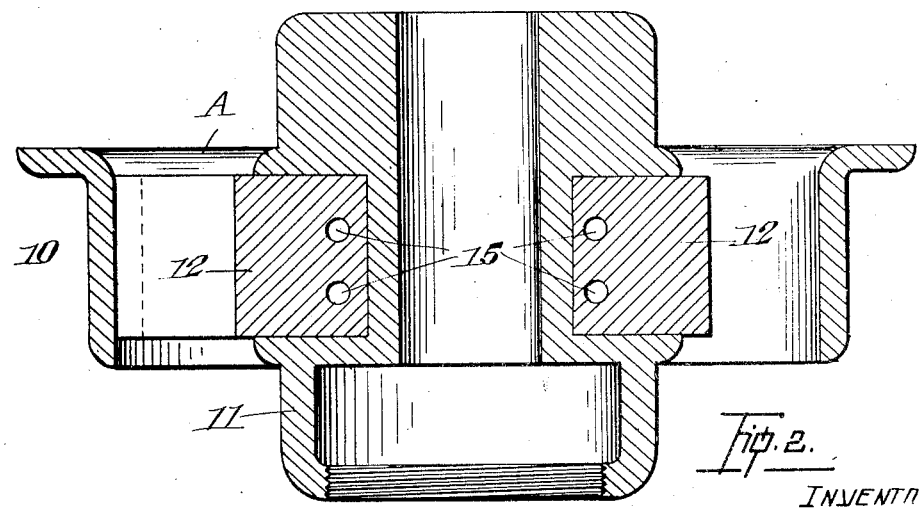
Fig. 2 is a transverse section through the car wheel.

In the drawings; A represents a car wheel comprising a steel tire 10, which is rolled and flanged, and this tire is supported from a cast iron hub 11 by means of steel spokes 12.

The hub 11 is provided with a plurality of pockets 13 for the reception of a lubricant, and oil holes 14 are provided whereby the lubricant is delivered to the axle on which this wheel is mounted.

In manufacturing the spokes 12 are provided with orifices 15 on the inner end, and are placed in a mold in which the hub 11 is to be cast. The hub is then cast so that the spokes 12 will be secured in position relatively thereto, and the metal of the hub will run through the orifices 15 and so anchor the inner ends of the spoke to the hub.

The hub and spokes are now arranged within the steel tire 10, and the outer ends of the spokes 12 are welded at 16 to the tire, this welding being carried out either by electric or oxy-acetylene method.

The advantages of this type of wheel over others at present in use, is that it is cheap to manufacture compared with an all cast steel wheel which is very expensive.

This form of wheel also possesses great durability as compared with cast iron wheels, which are extremely liable to break or fracture when subjected to rough usage incidental to ordinary mining operations.

A wheel manufactured after the present invention is extremely strong and possesses resiliency, which will eliminate any liability of breaking taking place due to shock or jarring, and is better adapted to withstand rough usage.

As many changes could be made in the above construction and many widely different embodiments of my invention within the scope of the claim constructed without departing from the spirit or scope thereof, it is intended that all matter contained in the accompanying specification and drawings shall be interpreted as illustrative and not in a limiting sense.

What I claim as my invention is:

A wheel comprising a rolled steel tire, a cast iron hub, and steel spokes having their inner ends embedded in the cast iron hub and their outer ends electrically welded to the steel tire.

In witness whereof I have hereunto set my hand in the presence of two witnesses.

FREDERICK BATES.

Witnesses:
    H. A. CHADWICK,
    MOLLY MORTIMER.